United States Patent
Huang

(10) Patent No.: US 11,492,253 B2
(45) Date of Patent: Nov. 8, 2022

(54) HYDROGEN STORAGE AND DELIVERY SYSTEM USING A SYNERGISTIC HYDROLYSIS TECHNOLOGY

(71) Applicant: Ge Solartech, LLC, Troy, MI (US)

(72) Inventor: Baoquan Huang, Troy, MI (US)

(73) Assignee: Ge Solartech, LLC, Troy, MI (US)

( * ) Notice: Subject to any disclaimer, the term of this patent is extended or adjusted under 35 U.S.C. 154(b) by 974 days.

(21) Appl. No.: 16/245,057

(22) Filed: Jan. 10, 2019

(65) Prior Publication Data

US 2020/0223691 A1 Jul. 16, 2020

(51) Int. Cl.
| | |
|---|---|
| C01B 3/06 | (2006.01) |
| H01M 8/0612 | (2016.01) |
| H01M 8/04082 | (2016.01) |
| C01B 3/08 | (2006.01) |

(52) U.S. Cl.
CPC ............... *C01B 3/065* (2013.01); *C01B 3/08* (2013.01); *H01M 8/04208* (2013.01); *H01M 8/04216* (2013.01); *H01M 8/0612* (2013.01); *H01M 2250/20* (2013.01)

(58) Field of Classification Search
CPC ...... C01B 3/065; C01B 3/08; H01M 8/04208; H01M 8/04216; H01M 8/0612; H01M 2250/20; H01M 8/065; Y02E 60/36; Y02E 60/50
See application file for complete search history.

(56) References Cited

U.S. PATENT DOCUMENTS

| | | | | |
|---|---|---|---|---|
| 5,593,640 A | * | 1/1997 | Long | B01J 7/02 |
| | | | | 422/111 |
| 2007/0020174 A1 | * | 1/2007 | Xu | C01B 3/08 |
| | | | | 423/657 |

OTHER PUBLICATIONS

Liu et al. "Investigation on the improved hydrolysis of aluminum-calcium hydride-salt mixture elaborated by ball milling" Energy 84 (2015) p. 714-721 (Year: 2015).*
Fan et al. "Hydrogen generation from Al/NaBH4 hydrolysis promoted by Li—NiCl2 additives", International Journal of hydrogen energy 36 (2011) p. 15673-15680 (Year: 2011).*
Ibikunle et al. "Kinetics and modeling studies of the CaH2/LiBH4, MgH2/LiBH4, Ca(BH4)2 and Mg(BH4)2 systems", Journal of Alloys and Compounds 556 (2013) 45-50 (Year: 2013).*

* cited by examiner

*Primary Examiner* — Steven J Bos
*Assistant Examiner* — Syed T Iqbal
(74) *Attorney, Agent, or Firm* — Baoquan Htuang

(57) ABSTRACT

A method for storing and delivering hydrogen gas is described. The method includes reacting a chemical hydride with water in the presence of a synergist. The synergist advances the extent of reaction of the chemical hydride with water to increase the yield of hydrogen production. The synergist reacts with byproducts formed in the reaction of the chemical hydride with water that would otherwise inhibit progress of the reaction. As a result, a greater fraction of hydrogen available from a chemical hydride is released as hydrogen gas.

4 Claims, 5 Drawing Sheets

US 11,492,253 B2

HYDROGEN STORAGE AND DELIVERY SYSTEM USING A SYNERGISTIC HYDROLYSIS TECHNOLOGY

FIELD

The present description relates to methods of storing and delivering hydrogen gas. More particularly, the present description relates to production of hydrogen gas from chemical hydrides. Most particularly, the present description relates to hydrolysis of chemical hydrides in the presence of a synergist to provide hydrogen at high rates and high efficiency.

BACKGROUND

Hydrogen is very abundant and is an almost ideal energy carrier that can be used for fuel economy while reducing reliance on fossil fuels, diversifying renewable energy and sustainable energy, and significantly reducing pollution and greenhouse gas emissions. Hydrogen is currently produced by steam reforming of natural gas, or electrolysis of water. To minimize environmental effects, hydrogen is preferably produced without the use of fossil fuels, such as from biomass, hydropower, wind and solar energy. Furthermore, hydrogen is a relatively low-cost fuel, although presently more expensive than petroleum. Hydrogen has the highest energy of all fuels per unit mass of chemical fuel. However, its low ambient temperature density results in low energy per unit volume and requires the development of advanced energy storage methods with higher energy densities. Therefore, hydrogen storage is the key technology for the development of hydrogen and fuel cell technology in station power, portable power and transportation applications.

For electrical power generation, fuel cells that efficiently convert hydrogen to electrical power emit only water. A fuel cell-powered automobile is significantly more energy efficient than a comparable vehicle with an internal combustion engine fueled by gasoline or diesel fuel. PEM fuel cells represent a safe, quiet, clean, high energy density, robust and environmentally desirable means of powering portable electronics if performance and cost factors are met. This future technology is touted as a strong and completely clean transport medium, thereby reducing the environmental degradation caused by vehicle emissions. However, to date there are only a few thousand hydrogen fuel vehicles sold or leased, mainly because the existing hydrogen storage technology is inefficient and expensive.

Hydrogen can be stored in the form of a cryogenic liquid or a high-pressure gas. The liquid technique requires chilling to −253° C. It is necessary to store hydrogen at this temperature to keep it liquid, and cooling hydrogen down to this temperature requires a lot of energy. Good insulation and expensive cryogenic storage containers are also needed to prevent evaporation and to maximize dormancy. Compression gas storage also has its challenges. Hydrogen as a gas usually requires an ultra-high-pressure tank (5,000-10,000 psi). The very high pressure poses potential safety problems. Hydrogen can also be stored at a lower pressure on a solid reversible metal hydride. The use of solid storage can increase the volumetric energy density of hydrogen by using a high-density metal alloy; however, current hydrogen storage alloys are too expensive and the weight ratio is currently too low to be practical. In a typical metal hydride tank, only about 1.0-1.2% of the total weight content is comprised of hydrogen.

Currently hydrogen-powered vehicles lag far behind battery-powered electric cars in market share. But several major automakers are fully committed to this new form of green technology. The first models are very expensive, but they offer a significant advantage over competing electric vehicles: driving range. Although today the vast majority of pure electric vehicles can cover about 200 miles in a single charge, a typical hydrogen-powered car can travel more than 300 miles in a single tank, thus rendering it competitive with the traditional gas or diesel car. Hydrogen-powered cars can also be refueled in a few minutes, unlike electric vehicles, which need several hours to recharge.

Fuel cell-powered vehicles, however, require sufficient hydrogen to enable a driving range of more than 300 miles, and the required amount of hydrogen must be capable of fast and easy refueling to insure commercial success. Current hydrogen vehicles rely on compressed gas stored onboard in a high capacity, extremely high pressure composite container to provide the amount of hydrogen necessary to extend the driving range. The prior art describes several methods for compressing and storing hydrogen as a high-pressure gas. However, this option has both technical and practical challenges, particularly when considering emerging commercial markets. Although compression can be used to increase the energy density by using a robust pressure vessel, compression comes at the expense of weight, compression energy and cost.

There is a need for more effective methods to produce hydrogen for fuel cells and other energy delivery systems that can use hydrogen as a fuel. The method should produce hydrogen safely with high efficiency, while minimizing system weight and complexity.

SUMMARY

The present description provides a technique for producing hydrogen that features high efficiency, safety, and minimal system weight. The technique is based on synergistic hydrolysis. In synergistic hydrolysis, a chemical hydride is reacted with water in the presence of a synergist. When the chemical hydride reacts with water, byproducts are formed as hydrogen gas is released. In conventional hydrolysis, the byproducts remain in the reaction mixture. In synergistic hydrolysis, a synergist is added to react with byproducts to further increase the yield of hydrogen production. Chemical hydrides used in synergistic hydrolysis include alkali metal hydrides, alkaline earth metal hydrides, and complex hydrides. Synergists include Al, Si, $Mg(BH_4)_2$, $Ca(BH_4)_2$, $Al(BH_4)_3$, and $Ti(BH_4)_4$. Synergistic hydrolysis can also be performed with combinations of two or more metal hydrides and/or two or more synergists.

The present description extends to:
A method for producing hydrogen comprising:
a first reaction, the first reaction comprising reacting a first chemical hydride with water in the presence of a first synergist, the first synergist selected from the group consisting of Al, Si, $Mg(BH_4)_2$, $Ca(BH_4)_2$, $Al(BH_4)_3$, and $Ti(BH_4)_4$, the first reaction producing $H_2$.

DETAILED DESCRIPTION OF THE ILLUSTRATED EMBODIMENTS

Figure 1:
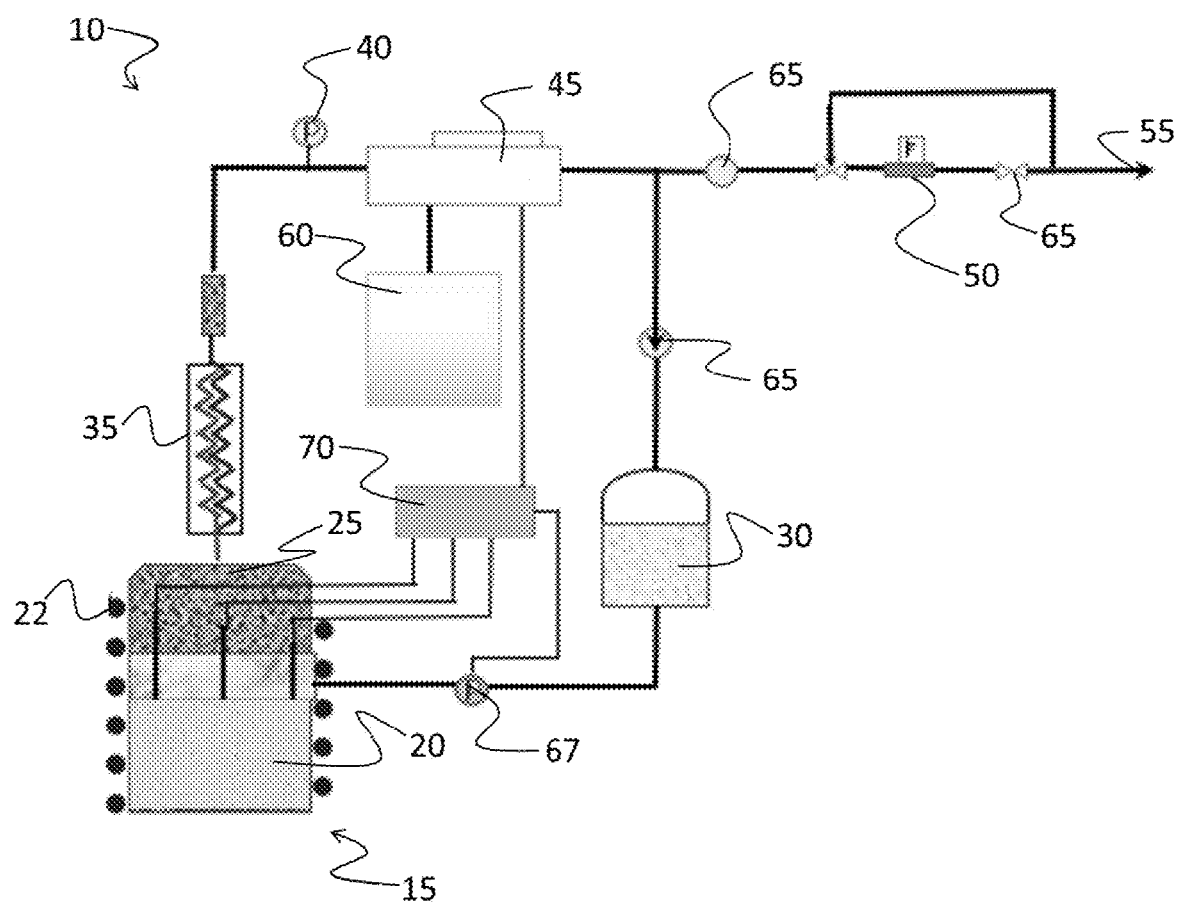
FIG. 1 depicts a storage and delivery system for synergistic hydrolysis of chemical hydrides.

Although this disclosure describes certain preferred embodiments in detail, other embodiments that are apparent to those of ordinary skill in the art, including embodiments that do not provide all the benefits and features set forth herein, are also within the scope of this disclosure. Accordingly, the scope of the disclosure is defined only by reference to the appended claims.

Chemical hydrides are used as reducing agents in the production of specialty chemicals, pharmaceuticals, precious metals and other products. Many low-cost chemical hydrides have high hydrogen content and because chemical hydrides readily react with water to produce hydrogen, they provide a very high hydrogen capacity and are thus very attractive materials for onboard hydrogen storage. However, in practice, a large amount of excess water is required in conventional hydrolysis to utilize chemical hydrides as sources of hydrogen, resulting in significant capacity loss. Excess water is needed because of the formation of hydroxides or other byproduct layers. The byproducts encapsulate or remain in close contact with the hydride and act to inhibit the extent of reaction of the hydride with water. To drive the conventional hydrolysis reaction closer to completion, a large amount of water must be added to dissolve these byproduct layers. Even worse, when reacted with water, most of the byproducts form hydrates, which do not decompose unless they are heated to a fairly high temperature. For example, the hydrolysis of $MgH_2$ produces insoluble $Mg(OH)_2$ as a byproduct, which is easy to separate, but requires the use of excessive water. In addition, the low solubility of $Mg(OH)_2$ usually results in the incomplete utilization of $MgH_2$. Hydroxide byproducts formed in the conventional hydrolysis of metal hydrides (including alkali metal hydrides and alkaline earth metal hydrides) are undesirable because (1) they limit utilization of the hydride and (2) they contain hydrogen in an unrecoverable form. Both effects lead to diminished yield of hydrogen from chemical hydrides.

Conventional hydrolysis reactions fail to provide acceptable kinetics and hydrogen yields needed for commercial applications and are not economically viable for use in hydrogen storage systems. New innovative approaches are needed to overcome the limitations of conventional hydrolysis reactions of chemical hydrides. To efficiently deliver hydrogen, a synergistic hydrolysis of chemical hydrides is described herein. The synergistic hydrolysis reaction includes a synergist, such Al or Si, in the reaction of hydrides with water. Because Al and Si can easily react with the hydroxide byproducts formed in the hydrolysis of hydrides, synergistic hydrolysis provides good kinetics as well as a high hydrogen yield, in a mode that enables controlled, on-demand release of $H_2$.

Synergistic hydrolysis enables efficient release of hydrogen gas from chemical hydrides while avoiding a substantial excess of water. Conventional hydrolysis of chemical hydrides such as $CaH_2$ and $MgH_2$ are self-limiting because of the formation of undesirable basic hydroxide byproducts. However, when a synergist such as Al or Si is mixed with a chemical hydride in a hydrolysis reaction, it can react with hydroxide byproducts to extend the hydrolysis reaction and increase the yield of hydrogen production. Since $Al(OH)_3$ is amphoteric and $Si(OH)_4$ is acidic, they can react with basic hydroxides to form "salts" and release water. In addition, these "salts", unlike alkaline hydroxides, tend not to form hydrates. As a result, the synergistic hydrolysis reaction is almost stoichiometric with respect to the chemical hydride and has excellent kinetics. Due to its favorable reaction kinetics and high efficiency, the synergistic hydrolysis reaction can produce hydrogen in a controlled manner through simple control of the supply of water.

Magnesium, calcium, aluminum and silicon are abundant on the earth's crust. Magnesium and silicon can even be extracted from coal. Calcium and magnesium hydrides are fairly inexpensive to produce and provide hydrogen in high yields in the present synergistic hydrolysis reaction. Numerous other hydride compounds also readily react with water in synergistic hydrolysis to produce hydrogen in near-stoichiometric amounts. The outstanding properties of the synergistic hydrolysis reaction enables efficient control of the rate of hydrogen release by controlling the water flow rate. Hydrogen stored in such a system is in a safer state and can be stored in a tank at a lower pressure.

The reactant mixture for synergistic hydrolysis offer high gravimetric reaction hydrogen density (>8 wt %, or >10 wt %, or >12 wt %, or >14 wt %) as well as a volumetric density that is higher than liquid hydrogen and higher than that of a hydrogen storage tank pressurized to 700 bar. In addition, the waste byproducts of synergistic hydrolysis are environmental-friendly and can be recycled for other industrial applications.

Since the synergistic hydrolysis reaction exhibits fast kinetics and is nearly stoichiometric in conversion, the rate of hydrogen release can be controlled by controlling the rate of water supplied to the reaction (similar to using a fuel pump to control the delivery of gas in a gas engine). A pressure switch can be used to automatically monitor and control system hydrogen pressures to insure adequate hydrogen supply while maintaining safe operating pressures. The pressure switch is a switch that closes the electrical contact when the supply of hydrogen reaches a pre-determined pressure. The switch can be designed to contact when the pressure drops. In this way, the system pressure can be controlled within a preferred operating range.

The synergistic hydrolysis reaction is exothermic and the large heat released in the reaction can be released to the environment using a heat exchanger. Air (or other gaseous fluids) or liquids can be used as coolants.

High densities of hydrogen can be produced safely in abundant amounts at low pressures in cost-effective systems when synergistic hydrolysis is utilized as the method for producing hydrogen gas. We expect this inexpensive system to achieve an energy density of 5.5 wt % and 40 enter. Such hydrogen storage systems will have a wide range of properties that make them extremely attractive for a range of applications, including portable, vehicular and bulk stationary storage solutions. The systems will be durable, inexpensive, and intrinsically safe. They will provide an exceptionally high gravimetric and volumetric hydrogen density. In addition, they can meet the cold-start requirement at various climate conditions.

Chemical hydrides are classified into three categories: ionic, covalent, and complex. The most common ionic hydrides are formed by the reaction of the strongly electropositive alkali metals and alkaline-earth metals with hydrogen. The bond of the ionic hydrides results from the strong electrostatic force existing between the dissimilar electric charges of the metal cation and hydride anion. Ionic hydrides typically have high thermal stability to decomposition reactions that produce hydrogen and react strongly with water, Examples of ionic hydrides include metal hydrides, such as alkali metal hydrides (e.g. LiH, NaH) and alkaline earth metal hydrides (e.g. $CaH_2$, $MgH_2$).

In covalent hydrides, hydrogen is covalently bonded to a metal. The covalent hydrides exhibit considerable similarity in theft properties. The bond between hydrogen and a metal element is a nonpolar electron-sharing type in which valence electrons are shared on an approximately equal bask between the elements held by the bond. In general, the molecules of covalent hydrides are not strongly attracted to each other, and the absence of strong intermolecular bonds leads to a high volatility and low melting point for covalent hydrides. Typical covalent hydrides are aluminum hydride, boron hydride, and the like.

Complex hydrides include compounds such as sodium borohydride in which hydrogen atoms are covalently bound to central elements (e.g., Al, B, C, N, Fe, etc.) by sharing their electrons. Such complex anions are stabilized by the donation of electrons from the more electropositive alkali metals and alkaline-earth elements. These compounds contain a large amount of chemically bound hydrogen (e.g., up to 20% by weight) that can be released by synergistic hydrolysis. In one embodiment, complex hydrides include a cation and an anion, where hydrogen is contained in the anion and is bonded to a central atom of the anion. Examples of complex hydrides include $NaBH_4$, $LiBH_4$, $NaAlH_4$, $LiAlH_4$, $Mg_2FeH_6$, $Ca_2FeH_6$, and $Ca_4Mg_4Fe_3FH_{22}$.

Chemical hydrides readily react with water to produce hydrogen. For commercial applications, it is desirable to maximize the yield of the hydrolysis reaction of chemical hydrides. As used herein, "hydrogen yield" refers to the ratio of the weight of hydrogen gas produced to the combined weights of chemical hydride and water used as starting materials in the reaction, and is expressed herein as a percent. Hydrogen yield can be expressed:

$$\text{Hydrogen Yield} = \frac{\text{weight } H_2 \text{ produced}}{\text{weight chemical hydride} + \text{weight } H_2O} \times 100\%$$

Hydrogen yield varies with reaction time and increases as the amount of hydrogen produced by a reaction increases.

As used herein, "stoichiometric yield" refers to the hydrogen yield obtained when a stoichiometric amount of water is used in the reaction and the stoichiometric amount of hydrogen is produced. In some embodiments, combinations of two or more chemical hydrides are included in a hydrolysis reaction. In such embodiments, hydrogen yield is defined to include the weight of all hydrogen produced, the weight of all water used in the reaction, and the weight of all hydrides used in the reaction. Stoichiometric yield is similarly defined when two or more metal hydrides are combined in a reaction.

The synergistic hydrolysis reaction described herein provides efficient production of hydrogen with high hydrogen yield. In various embodiments, the hydrogen yield is greater than 70%, or greater than 75%, or greater than 80%, or greater than 85%, or greater than 90% of the stoichiometric yield.

As used herein, "hydrogen reaction density" refers to the ratio of the weight of hydrogen produced to the weight of chemical hydride in a stoichiometric hydrolysis reaction and is expressed herein as a percent.

As used herein, "conventional hydrolysis reaction" or "conventional hydrolysis" refers to a reaction in which a chemical hydride and water are the reactants. A synergist is not present in a conventional hydrolysis reaction.

As used herein, "synergistic hydrolysis reaction" or "synergistic hydrolysis" refers to a reaction in which a chemical hydride, water, and a synergist are the reactants.

By way of example, the conventional hydrolysis reaction of the complex hydride $NaBH_4$ is $$NaBH_4 + 2H_2O \rightarrow NaBO_2 + 4H_2 \qquad (1)$$

If one mole of $NaBH_4$ is used as a starting material, the weight of $NaBH_4$ is 37.8 g and the stoichiometric weight of water is 36, 0 g. The stoichiometric weight of hydrogen produced is 8.0 g. The stoichiometric yield is $8.0/(37.8+36.0) \times 100 = 10.8\%$ and the hydrogen reaction density is $8.0/37.8 \times 100\% = 21.2\%$. If the reaction conditions do not permit the reaction to run to completion or require an amount of water in excess of the stoichiometric weight, the hydrogen yield is less than the stoichiometric yield. To improve the efficiency of hydrogen production, it is preferable to maximize the hydrogen yield of the hydrolysis reaction of the chemical hydride.

In practice, $NaBH_4$ is known to react rapidly with water, but requires a strong alkaline solution (typically 3 wt % of NaOH) to minimize degradation. The addition of NaOH not only forms a corrosive environment for the containment vessel, but also reduces the solubility of $NaBH_4$. The low solubility of $NaBH_4$ in water (<35 wt % at 25° C.) requires additional water to advance the reaction. The additional water is an amount in excess of the stoichiometric weight and must be included in the containment vessel, which increases weight and reduces the hydrogen yield to <7.5%. In addition, the solubility of $NaBH_4$ changes with temperature so that the solubility is only <28 wt % at <0° C., thus reducing the hydrogen yield further to <5.0%. Conventional hydrolysis of other hydrides that provide similar hydrogen capacity also requires a large excess of water and thus result in a significant loss of capacity. During conventional hydrolysis of chemical hydrides, hydroxide or other byproducts (e.g. $NaBO_2$, $LiBO_2$, $NaAlO_2$, $LiAlO_2$) form an encapsulating or surface byproduct layer on the chemical hydride that inhibits further reaction of the chemical hydride. A large amount of water must be added to dissolve or displace a byproduct layer that encapsulates, shields, or adheres to the surface of the hydride in order for the reaction of the chemical hydride to progress further to completion. In addition, most of the alkaline hydroxides and other byproducts form hydrates in the presence of water. These hydrates are stable and can only be decomposed to release water at high temperatures. For example, complete hydrolysis of $LiBH_4$ requires about 240% of the stoichiometric weight of water. The hydrogen yield of $LiBH_4$ in practice is only <7.4% as compared to the stoichiometric yield of 13.8%.

As a result, the conventional hydrolysis reaction of chemical hydrides has a low efficiency because a large amount of excess water must be used to obtain an acceptable hydrogen yield. In addition, the conventional hydrolysis reactions are unpredictable, so they cannot be used reliably in hydrogen storage systems. The synergistic hydrolysis process described herein can overcome the limitations of conventional hydrolysis and can provide nearly stoichiometric reaction of chemical hydrides with nearly stoichiometric weights of water.

The conventional hydrolysis of chemical hydrides such as $CaH_2$ and $MgH_2$ forms metal hydroxide byproducts that inhibit reaction and limit hydrogen yield. Byproducts (e.g. $LiBO_2$, $NaBO_2$, $LiAlO_2$, and $NaAlO_2$) formed in conventional hydrolysis reactions of complex hydrides similarly limit hydrogen yield. However, when synergists such as Al and/or Si are included in accordance with the synergistic hydrolysis reactions of chemical hydrides described herein, they can react with the byproducts, thereby extending the reaction and increasing the hydrogen yield of synergistic hydrolysis reactions relative to conventional hydrolysis reactions. Because $Al(OH)_3$ is amphoteric and $Si(OH)_4$ is acidic, they can react with basic hydroxide byproducts to form "salts" and release water. Furthermore, unlike the basic hydroxide byproducts, these "salts" tend not to form hydrates.

Conventional hydrolysis is an exothermic reaction. The conventional hydrolysis of $MgH_2$, for example, is very slow at room temperatures, but the conventional hydrolysis rate can be greatly enhanced by the addition of $CaH_2$ because $CaH_2$ reacts more readily with water at room temperature and the heat released from the exothermic reaction $CaH_2+H_2O$ increases the temperature of the reaction mixture and results in an increased rate of conventional hydrolysis of $MgH_2$. Synergistic hydrolysis is also an exothermic reaction and a similar effect occurs for synergistic hydrolysis reactions that combine $MgH_2$ and $CaH_2$ (and other combinations of two or more chemical hydride reactants).

As a result, the synergistic hydrolysis of chemical hydrides with a synergist as described herein can produce hydrogen at high rates with hydrogen yields approaching the stoichiometric yield. Due to favorable kinetics and high efficiency, synergistic hydrolysis can produce hydrogen in a controlled manner; that is, the rate at which hydrogen is generated can be controlled by the rate of water supplied to provide on-demand release of hydrogen.

Synergistic Hydrolysis of Alkaline-Earth Metal Hydrides $CaH_2$ and $MgH_2$ are preferred alkaline earth metal hydrides because they are inexpensive and have a high hydrogen content. In principle, the conventional hydrolysis reactions of $CaH_2$ and $MgH_2$ are $$CaH_2+H_2O \rightarrow CaO+2H_2 \quad (2)$$

$$MgH_2+H_2O \rightarrow MgO+2H_2 \quad (3)$$

In practice, however, $CaH_2$ and $MgH_2$ preferentially react with water to form hydroxide byproducts:

$$CaH_2+2H_2O \rightarrow Ca(OH)_2+2H_2 \quad (4)$$

$$MgH_2+2H_2O \rightarrow Mg(OH)_2+2H_2 \quad (5)$$

The temperatures required to decompose the hydroxide byproduct $(Ca(OH)_2)$ to the corresponding oxide $(CaO+H_2O)$ are extreme and beyond temperatures preferred for practical hydrogen delivery applications. As a result, the hydroxide byproducts are stable and remain in the reaction mixture. While not wishing to be bound by theory, it is believed that in aqueous systems, the hydroxide byproducts associate with unreacted hydride and form a surface layer that inhibits migration of water to the hydride. As a result, the presence of hydroxide byproducts limits utilization of hydride starting materials and leads to hydrogen yields that are well below the stoichiometric yield.

The synergistic hydrolysis reaction overcomes the limiting effect of hydroxide byproducts by including a synergist in the reaction mixture. The synergist reacts with hydroxide byproducts to deplete them and allow further advancement of the reaction of the hydride starting material to provide increased hydrogen yields. Synergists include Al, Si, and/or metal boron hydrides, such as $Mg(BH_4)_2$, $Ca(BH_4)_2$, $Al(BH_4)_3$, and $Ti(BH_4)_4$. Reactions of Al and Si with hydroxide byproducts are shown below:

$$2Al+3Ca(OH)_2+H_2O \rightarrow 3CaO \cdot Al_2O_3+3H_2 \quad (6)$$

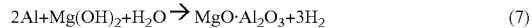
$$2Al+Mg(OH)_2+H_2O \rightarrow MgO \cdot Al_2O_3+3H_2 \quad (7)$$

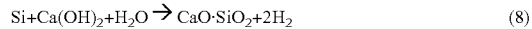
$$Si+Ca(OH)_2+H_2O \rightarrow CaO \cdot SiO_2+2H_2 \quad (8)$$

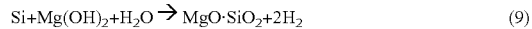
$$Si+Mg(OH)_2+H_2O \rightarrow MgO \cdot SiO_2+2H_2 \quad (9)$$

where $3CaO \cdot Al_2O_3$, $MgO \cdot Al_2O_3$ $CaO \cdot SiO_2$, and $MgO \cdot SiO_2$ represent insoluble complex alkaline earth aluminate and silicate phases present in the $CaO—Al_2O_3$ or $MgO—Al_2O_3$ phase diagram.

Synergistic hydrolysis can be performed with a single chemical hydride and a single synergist, or a combination of two or more chemical hydrides and a single synergist, or a single chemical hydride and a combination of two or more synergists, or a combination of two or more chemical hydrides and a combination of two or more synergists. In the above reaction scheme, for example, synergistic hydrolysis can be performed on $CaH_2$ alone, $MgH_2$ alone, or a combination (in varying proportions) of $CaH_2$ and $MgH_2$ in the presence of Al alone, Si alone, or a combination (in varying proportions) of Al, Si, and/or metal boron hydrides, such as $Mg(BH_4)_2$, $Ca(BH_4)_2$, $Al(BH_4)_3$, and $Ti(BH_4)_4$.

For the system to be optimally effective, the formulation and amounts should be carefully selected according to their chemical properties and the requirements of the application. For example, $MgH_2$ has a high reaction hydrogen density but a low initial reaction kinetics, while $CaH_2$ has excellent initial reaction kinetics. Si can bond with more hydrogen atoms than Al, but the reaction kinetics between Si and alkaline earth metal hydroxides are not as favorable as the reaction kinetics between Al and alkaline earth metal hydroxides. The reaction kinetics depends on the composition of the mixture and can be tailored by varying the composition as needed to provide hydrogen release rates required for specific applications.

Synergistic Hydrolysis of Alkali Metal Hydrides

The alkali metal hydrides LiH and NaH are interesting for practical applications because they are more reactive with water than $MgH_2$. However, production of alkali metal hydrides requires more energy than the production of alkaline earth metal hydrides, and the waste recycling of alkali metal hydrides is more difficult, requiring significant labor and costs.

As is the case for alkaline earth metal hydrides, reactions of alkali metal hydrides produce hydroxide byproducts that limit hydrogen yield. LiH and NaH, for example, react with water as follows:

$$LiH+H_2O \rightarrow LiOH+H_2 \quad (10)$$

$$NaH+H_2O \rightarrow NaOH+H_2 \quad (11)$$

Inclusion of Al and/or Si as a synergist depletes the alkali metal hydroxide byproducts according to the following reactions:

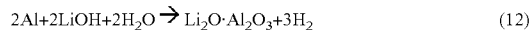
$$2Al+2LiOH+2H_2O \rightarrow Li_2O \cdot Al_2O_3+3H_2 \quad (12)$$

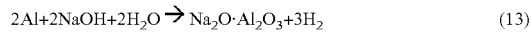
$$2Al+2NaOH+2H_2O \rightarrow Na_2O \cdot Al_2O_3+3H_2 \quad (13)$$

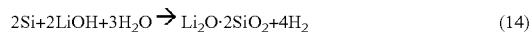
$$2Si+2LiOH+3H_2O \rightarrow Li_2O \cdot 2SiO_2+4H_2 \quad (14)$$

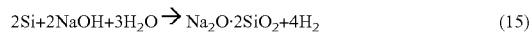
$$2Si+2NaOH+3H_2O \rightarrow Na_2O \cdot 2SiO_2+4H_2 \quad (15)$$

where $Li_2O \cdot Al_2O_3$, $Na_2O \cdot Al_2O_3$ $Li_2O \cdot 2SiO_2$, and $Na_2O \cdot 2SiO_2$ represent complex alkali aluminate and silicate phases.

Synergists for the synergistic hydrolysis reaction of alkali metal hydrides include Al and Si. The byproducts LiOH and NaOH are strongly alkaline and can react easily with silicon, but are more corrosive to the containment vessel. Therefore, we can increase the silicon content in the alkali metal hydride synergistic hydrolysis reaction system while maintaining good kinetics. The silicon can bond with more hydrogen than Al and the cost of Si is lower than the cost of Al. LiH and NaH can be reacted separately or in combination in a synergistic hydrolysis reaction in the presence of one or a combination of two or more synergists.

Synergistic Hydrolysis of Complex Main Group Hydrides

Due to their high hydrogen density and good reaction kinetics, complex hydrides such as $LiBH_4$, $NaBH_4$, $LiAlH_4$ and $NaAlH_4$ are considered promising materials for hydrogen production, although they are expensive to produce. The preparation of such complex hydrides is energy-intensive and requires a multi-step process. Reactions of complex hydrides with water produce byproducts that inhibit the reaction and limit hydrogen yield. Represent reactions of complex hydrides with water are shown below:

$$LiBH_4 + 2H_2O \rightarrow LiBO_2 + 4H_2 \qquad (16)$$

$$NaBH_4 + 2H_2O \rightarrow NaBO_2 + 4H_2 \qquad (17)$$

$$LiAlH_4 + 2H_2O \rightarrow LiAlO_2 + 4H_2 \qquad (18)$$

$$NaAlH_4 + 2H_2O \rightarrow NaAlO_2 + 4H_2 \qquad (19)$$

In these reactions, $LiBO_2$, $NaBO_2$, $LiAlO_2$, and $NaAlO_2$ are byproducts that can be depleted with a synergist. Reactions with the synergists Al and Si are shown below:

$$2Al + 2LiBO_2 + 3H_2O \rightarrow Li_2O \cdot B_2O_3 \cdot Al_2O_3 + 3H_2 \qquad (20)$$

$$2Al + 2LiAlO_2 + 3H_2O \rightarrow Li_2O \cdot 2Al_2O_3 + 3H_2 \qquad (21)$$

$$2Al + 2NaBO_2 + 3H_2O \rightarrow Na_2O \cdot B_2O_3 \cdot Al_2O_3 + 3H_2 \qquad (22)$$

$$2Al + 2NaAlO_2 + 3H_2O \rightarrow Na_2O \cdot 2Al_2O_3 + 3H_2 \qquad (23)$$

$$2Si + 2LiBO_2 + 4H_2O \rightarrow Li_2O \cdot B_2O_3 \cdot 2SiO_2 + 4H_2 \qquad (24)$$

$$2Si + 2LiAlO_2 + 4H_2O \rightarrow Li_2O \cdot Al_2O_3 \cdot 2SiO_2 + 4H_2 \qquad (25)$$

$$2Si + 2NaBO_2 + 4H_2O \rightarrow Na_2O \cdot B_2O_3 \cdot 2SiO_2 + 4H_2 \qquad (26)$$

$$2Si + 2NaAlO_2 + 4H_2O \rightarrow Na_2O \cdot Al_2O_3 \cdot 2SiO_2 + 4H_2 \qquad (27)$$

where $Li_2O \cdot B_2O_3 \cdot Al_2O_3$, $Li_2O \cdot 2Al_2O_3$, $Na_2O \cdot B_2O_3 \cdot Al_2O_3$, $Na_2O \cdot 2Al_2O_3$ $Li_2O \cdot 2SiO_2$, and $Na_2O \cdot 2SiO_2$ represent complex alkali aluminate and silicate phases.

The hydrolysis byproducts of complex hydrides (e.g. $LiBO_2$, $NaBO_2$, $LiAlO_2$, $NaAlO_2$) are strongly alkaline, high in pH, and react readily with Al and Si in a synergistic hydrolysis reaction. $LiBH_4$, $NaBH_4$, $LiAlH_4$, and $NaAlH_4$ can be reacted separately or in combinations of two or more in a synergistic hydrolysis reaction in the presence of one or a combination of two or more synergists.

Synergistic Hydrolysis of Complex Transition Metal Hydrides $Mg_2FeH_6$, $Ca_2FeH_6$ and $Ca_4Mg_4Fe_3H_{22}$ are of interest to practical applications because of their high hydrogen content and low material cost. At present, the preparation of these hydrides requires higher pressures and temperatures because of their slower reaction kinetics. However, the cost of these hydrides will significantly decrease with the development of moderate synthesis conditions. The hydrolysis behavior of these complex hydrides is similar to that of $MgH_2$ and $CaH_2$.

Synergists for the synergistic hydrolysis of complex transition metal hydrides include Al, Si, $Mg(BH_4)_2$, $Ca(BH_4)_2$, $Al(BH_4)_3$, and $Ti(BH_4)_4$. The byproducts (e.g. $Mg(OH)_2$, $Ca(OH)_2$, $Fe(OH)_2$) are alkaline and can react with a synergist. Reactions of representative transition metal hydrides with water are shown below:

$$Mg_2FeH_6 + 6H_2O \rightarrow 2Mg(OH)_2 + Fe(OH)_2 + 6H_2 \qquad (28)$$

$$Ca_2FeH_6 + 6H_2O \rightarrow 2Ca(OH)_2 + Fe(OH)_2 + 6H_2 \qquad (29)$$

$$Ca_4Mg_4Fe_3H_{22} + 22H_2O \rightarrow 4Ca(OH)_2 + 4Mg(OH)_2 + 3Fe(OH)_2 + 22H_2 \qquad (30)$$

The reactions of the hydroxide byproducts $Ca(OH)_2$, $Mg(OH)_2$, with the synergists Al and Si are shown above. The transition metal hydroxide byproduct $Fe(OH)_2$ is very weakly alkaline and can react with Al at elevated temperatures. $Mg_2FeH_6$, $Ca_2FeH_6$, and $Ca_4Mg_4Fe_3H_{22}$ can be reacted separately or in combinations of two or more in a synergistic hydrolysis reaction in the presence of one or a combination of two or more synergists.

Hydrogen Storage System

Once a formulation for synergistic hydrolysis is selected, a hydrogen storage system can be designed. Design considerations include the containment vessel and control system, as well as related system engineering issues. Technical requirements for the storage system include: 1) capability to control the release rate of hydrogen produced by synergistic hydrolysis; 2) capability to control the pressure of the containment vessel and supply of water with time according to demands imposed by the application; 3) capability to control the conditions under which the required supply of hydrogen varies with time in a particular application; 4) temperature control and heat dissipation; and 5) a low-cost vessel design to provide safe and durable system containment.

Since a synergistic hydrolysis reaction is immediate and almost stoichiometric, we can control the rate of hydrogen release by controlling the rate of water supply, much like a fuel pump in a gas engine. A pressure switch can be used to automatically monitor and control the system hydrogen pressure to maintain safe operating conditions. The pressure switch closes the electrical contact when the system pressure reaches a certain pressure. The switch can be designed to contact when the pressure drops. In this way, the pressure can be controlled within a certain range.

A schematic hydrogen storage system is shown in FIG. 1. Storage system 10 includes reactor 15 with heat exchanger 22 that contains a chemical hydride and headspace 25 for collecting hydrogen when water from water supply 30 is introduced to reactor 15 through pump 67. The hydrogen produced is passed through heat exchanger 35, pressure transducer 40, pressure switch 45, and flow meter 50 to provide a supply 55 of hydrogen. A portion of the hydrogen produced can be stored in reservoir 60, The system 10 further includes various valves 65 and controller 70 to regulate process flows.

Due to the potentially large amount of heat released, a heat exchanger is preferably included in the system design to distribute heat to the environment. The system can be cooled by air (a gaseous fluid) or by a liquid coolant maintained by an air-cooled heat exchanger, just like a radiator in a gas engine.

Examples

Figure 2:
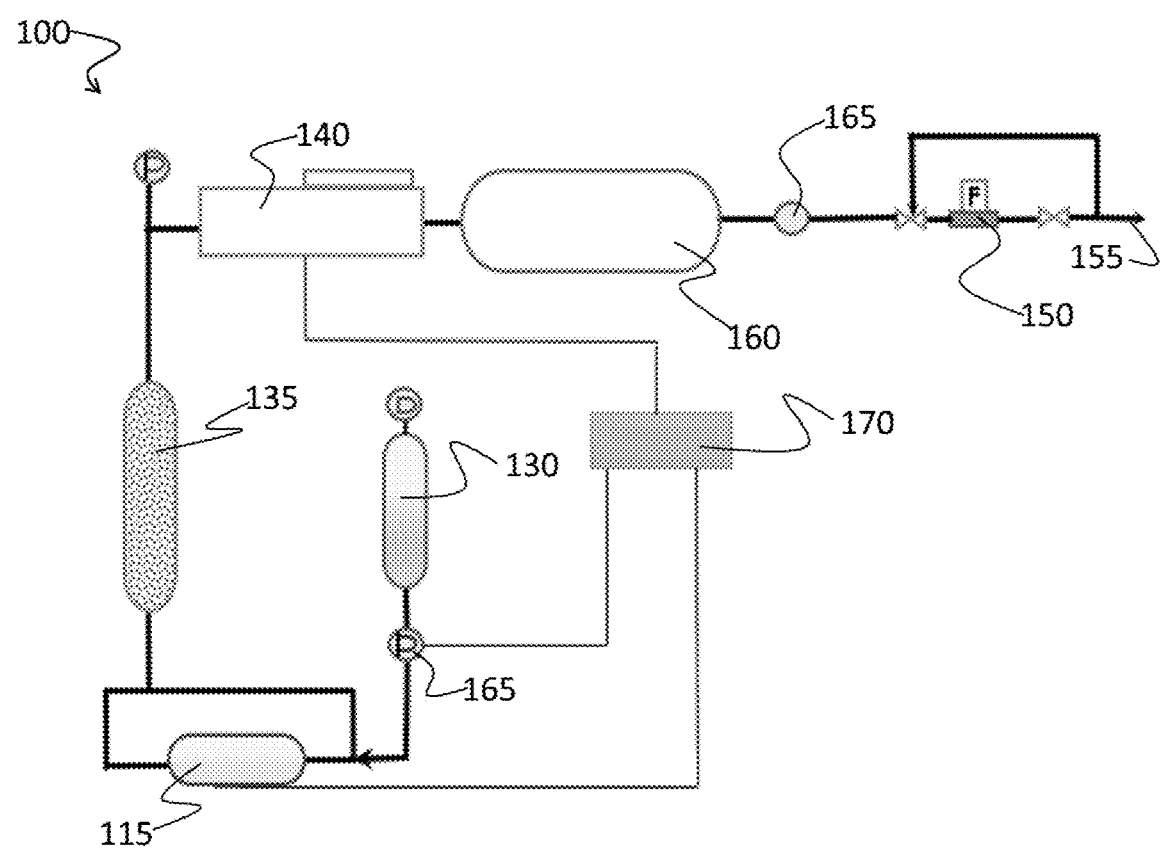
FIG. 2 shows a schematic of a hydrolysis testing system.

Synergistic hydrolysis reactions of various chemical hydrides were demonstrated with the test reactor system similar to the system shown in FIG. 2. Test system 100 includes reactor 115 that contains a chemical hydride and headspace for collecting hydrogen when water from water supply 130 is introduced to reactor 115. The hydrogen produced is passed through heat exchanger 135, pressure switch 140, and flow meter 150 to provide a supply 155 of hydrogen. A portion of the hydrogen produced can be stored in reservoir 160. The system 100 further includes various valves 165 and controller 170 to regulate process flows. The heat liberated in the synergistic hydrolysis reactions was sufficient to convert water to steam. The test reactor system was designed to condense the steam and return it to the reaction as water. Water recovery prevented loss of water and permitted accurate determination of the amount of water consumed.

The reactor is a Swagelok sample cylinder with volume 150 cm$^3$ and weight 460 g. The total volume of gas reservoirs (including system tubes) in the system was about 7 liters. MgH$_2$ (15 g) and Al (15 g) powders, and CaH$_2$ granules (15 g) were mixed thoroughly in a mortar. Water (45 g) was supplied to the reactor to initiate and perpetuate reaction of the sample cylinder to form hydrogen. Hydrogen was collected in the reservoir volume and the pressure of the hydrogen produced was monitored. Hydrogen pressures in excess of 100 psig pressure were measured.

Figure 3:
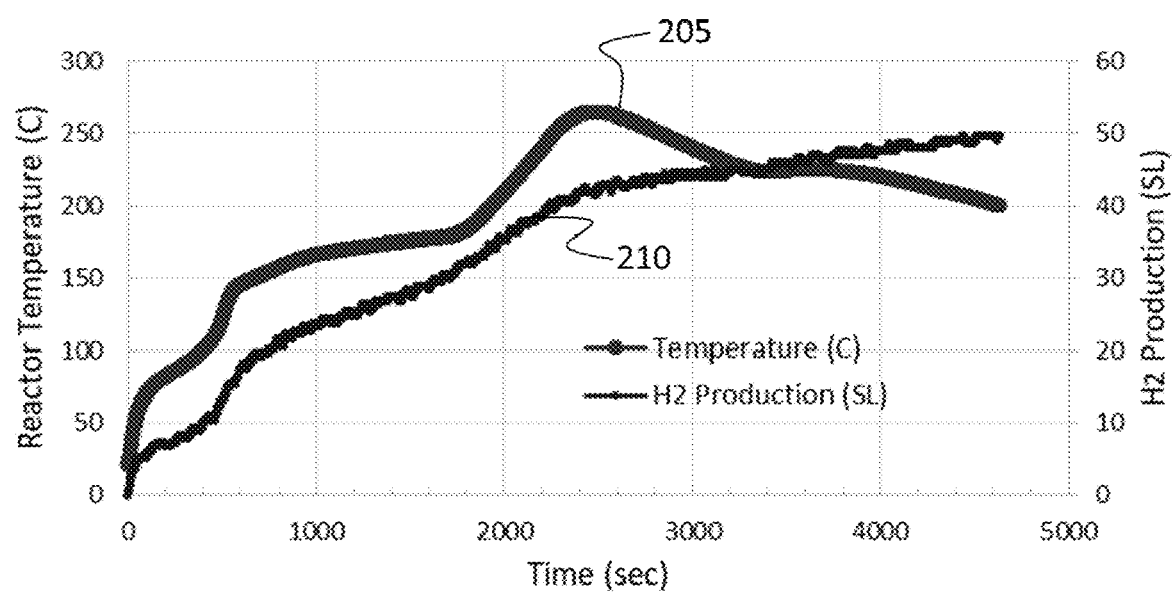
FIG. 3 shows the reactor temperature and hydrogen production as a function of reaction time for a synergistic hydrolysis reaction of $MgH_2$ and $CaH_2$ in the presence of Al.
Figure 4:
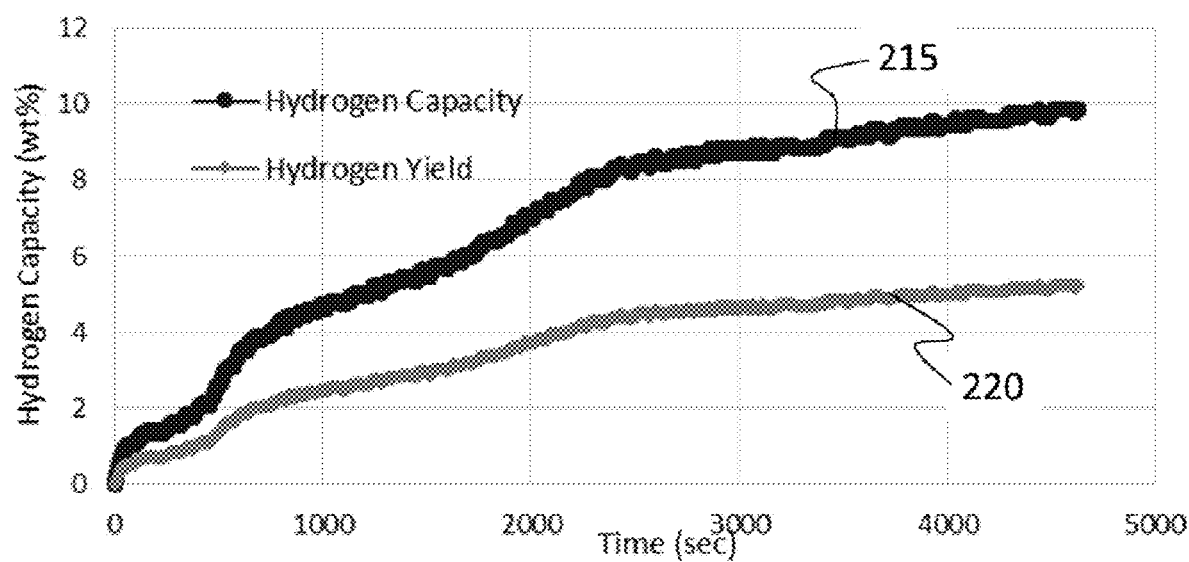
FIG. 4 shows the hydrogen capacity and hydrogen yield as a function of reaction time for a synergistic hydrolysis reaction of $MgH_2$ and $CaH_2$ in the presence of Al.

FIGS. 3 and 4 show results for the synergistic hydrolysis reaction of a combination of CaH$_2$ and MgH$_2$ using Al as a synergist. The synergistic hydrolysis reaction for this experiment was:

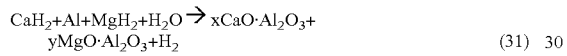

$$CaH_2+Al+MgH_2+H_2O \rightarrow xCaO\cdot Al_2O_3+ yMgO\cdot Al_2O_3+H_2 \quad (31)$$

The hydrogen produced by the reaction was collected and monitored as a function of reaction time. FIG. 3 shows the cumulative production of hydrogen (in units of standard liters (SL)) (Trace 205) and the temperature of the reactor bed during the reaction (Trace 210). In the reaction, sufficient heat was generated to raise the temperature of the reaction bed to 265° C. In a practical system, larger quantities of starting materials would be used and the temperature of the reactor bed would be much higher than in the test system used in this example. Management of heat in a practical system can be accomplished with a heat exchanger (as shown, for example, in FIG. 1). FIG. 4 shows the hydrogen capacity (Trace 215) and the hydrogen yield (Trace 220) of the reaction. The results indicate that the system of CaH$_2$+MgH$_2$+Al has a high potential energy density and can meet commercial requirements for onboard vehicle hydrogen storage.

Figure 5:
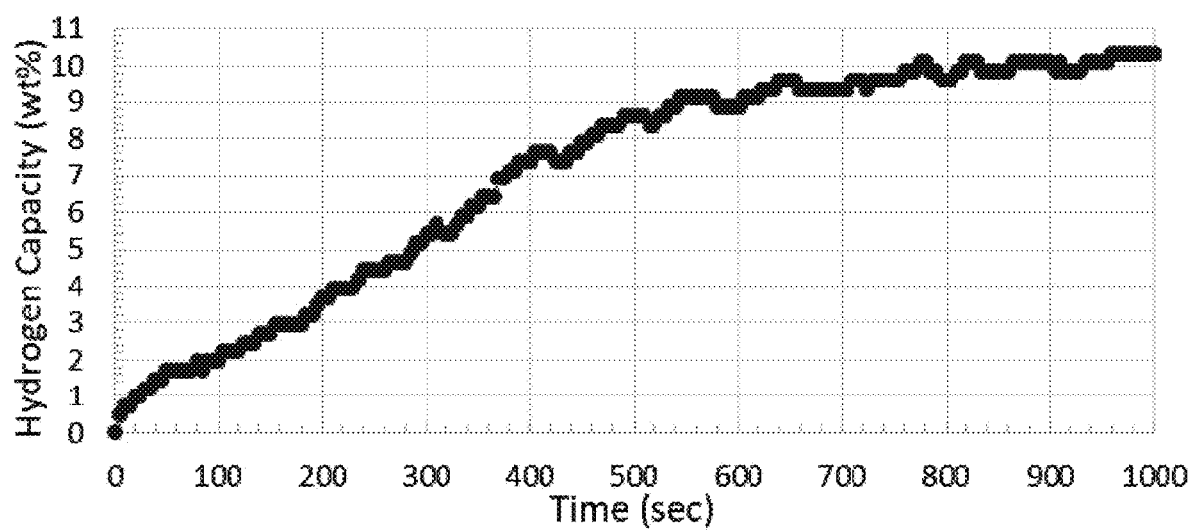
FIG. 5 shows the hydrogen capacity as a function of reaction time for a synergistic hydrolysis reaction of $MgH_2$, $CaH_2$, and $NaBH_4$ in the presence of Al.

In a further experiment, 5 g of CaH$_2$, 5 g of MgH$_2$, 5 g of Al, and 2.5 g of NaBH$_4$ were reacted with 45 g of water. FIG. 5 shows the hydrogen capacity as a function of time. The data indicate a significant production of hydrogen over relatively short time periods and demonstrate the favorable kinetics of the reaction.

In practical applications, the hydride starting materials and synergist are present in fixed and large amounts in a reactor and the synergistic hydrolysis reaction is run with water as the limiting reactant. Based on the need for hydrogen at a particular time in a particular application, a predetermined amount of water is supplied to the hydride starting materials and synergist. The amount of water is much less than the stoichiometric amount of water needed to react with the entirety of hydride starting material present in the reactor. Instead, the water reacts with a portion of the hydride starting material. The reaction proceeds nearly to completion. Heat generated by the reaction increases the reaction temperature to improve kinetics. Through control of water delivery, the synergistic hydrolysis reaction can be designed to provide hydrogen in a transient (time-released) manner with hydrogen yields that closely approach the stoichiometric yield.

Those skilled in the art will appreciate that the methods and designs described above have additional applications and that the relevant applications are not limited to those specifically recited above. Also, the present invention may be embodied in other specific forms without departing from the essential characteristics as described herein. The embodiments described above are to be considered in all respects as illustrative only and not restrictive in any manner.

The invention claimed is:

1. A method for producing hydrogen comprising:
a first reaction, the first reaction comprising reacting a first chemical hydride with water in the presence of a first synergist, the first synergist selected from the group consisting of Al and Si, the first reaction producing H$_2$; and
a second reaction, the second reaction comprising reacting a second chemical hydride with the water in the presence of the first synergist, the second chemical hydride comprising a cation and an anion, the anion comprising hydrogen bonded to a central atom, the second chemical hydride is selected from the group consisting of LiBH$_4$, NaBH$_4$, LiAlH$_4$, NaAlH$_4$, Mg$_2$FeH$_6$ and Ca$_4$Mg$_4$Fe$_3$H$_{22}$;
wherein the first chemical hydride is selected from the group consisting of LiBH$_4$, NaBH$_4$, LiAlH$_4$, NaAlH$_4$, Mg$_2$FeH$_6$ and Ca$_4$Mg$_4$Fe$_3$H$_{22}$.

2. The method of claim 1, wherein the first reaction produces a metal hydroxide and wherein the first synergist reacts with the metal hydroxide.

3. The method of claim 1, wherein a hydrogen yield of the first reaction is greater than 70% of the stoichiometric yield of the first reaction.

4. The method of claim 1, wherein a hydrogen yield of the first reaction is greater than 90% of the stoichiometric yield of the first reaction.

* * * * *